(12) United States Patent
Huang et al.

(10) Patent No.: US 9,144,134 B2
(45) Date of Patent: Sep. 22, 2015

(54) METHOD FOR COATING POLYIMIDE ON LIQUID CRYSTAL DISPLAY PANEL

(75) Inventors: Bingcheng Huang, Guandong (CN); Xiaoxin Zhang, Guandong (CN); Huifang Duan, Guandong (CN); Hao Jin, Guandong (CN); Junjie Huang, Guandong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 401 days.

(21) Appl. No.: 13/699,074

(22) PCT Filed: Sep. 13, 2012

(86) PCT No.: PCT/CN2012/081315
§ 371 (c)(1),
(2), (4) Date: Nov. 20, 2012

(87) PCT Pub. No.: WO2014/029147
PCT Pub. Date: Feb. 27, 2014

(65) Prior Publication Data
US 2014/0057044 A1    Feb. 27, 2014

(30) Foreign Application Priority Data
Aug. 24, 2012 (CN) .......................... 2012 1 0305653

(51) Int. Cl.
*H05B 33/10* (2006.01)
*C08G 73/10* (2006.01)
*G02F 1/1337* (2006.01)

(52) U.S. Cl.
CPC ................ *H05B 33/10* (2013.01); *C08G 73/10* (2013.01); *G02F 1/133723* (2013.01)

(58) Field of Classification Search
CPC ....................................................... H05B 33/10
See application file for complete search history.

(56) References Cited

U.S. PATENT DOCUMENTS

| | | | |
|---|---|---|---|
| 2003/0161956 A1* | 8/2003 | Makinen et al. | 427/355 |
| 2004/0169805 A1* | 9/2004 | Yun et al. | 349/124 |
| 2005/0238896 A1* | 10/2005 | Itoh et al. | 428/473.5 |
| 2007/0275176 A1* | 11/2007 | Cho et al. | 427/427.6 |
| 2010/0039577 A1* | 2/2010 | Hirato | 349/54 |

FOREIGN PATENT DOCUMENTS

| | | |
|---|---|---|
| CN | 101153977 A | 4/2008 |
| CN | 100421941 C | 10/2008 |
| CN | 101045613 A | 1/2012 |
| CN | 102314024 A | 1/2012 |
| JP | 2007-201427 A | 8/2007 |

* cited by examiner

*Primary Examiner* — Nathan T Leong
(74) *Attorney, Agent, or Firm* — Andrew C. Cheng

(57) ABSTRACT

A method for coating polyimide on liquid crystal display panel includes: (1) providing nozzles and a glass substrate; (2) tightly and regularly juxtaposing the nozzles in a row so that the row has a length that corresponds to width of the glass substrate; (3) vertically positioning the entire row above the glass substrate so as to correspond to the glass substrate along the width of the glass substrate; (4) simultaneously activating the nozzles to allow each of the nozzles to simultaneously drip down polyimide solution according to predetermined flow rate, while moving the glass substrate so as to have the polyimide solution uniformly applied to the glass substrate form a polyimide film; and (5) using a doctor blade to shape the polyimide film that is uniformly coated on the glass substrate so as to provide a regular and flat surface of the polyimide film on the glass substrate.

9 Claims, 3 Drawing Sheets

METHOD FOR COATING POLYIMIDE ON LIQUID CRYSTAL DISPLAY PANEL

BACKGROUND OF THE INVENTION

1. Field of the Invention

The present invention relates to the field of liquid crystal displaying, and in particular to a method for coating polyimide on a liquid crystal display panel.

2. The Related Arts

Liquid crystal display (LCD) has a variety of advantages, such as thin device body, low power consumption, and being free of radiation, and is thus widely used. Most of the LCDs that are currently available in the market are backlighting LCDs, which comprise a liquid crystal display panel and a backlight module. The operation principle of the liquid crystal display panel is that liquid crystal molecules are interposed between two parallel glass substrates and electricity is applied to the glass substrates to control variation of orientation of the liquid crystal molecules in order to refract light emitting from the backlight module for generating images.

A liquid crystal display panel is generally composed of a color filter substrate, a thin film transistor (TFT) substrate, and liquid crystal (LC) and sealant interposed between the CF substrate and the TFT substrate. A general manufacturing process comprises a front stage of array process (including thin film, yellow light, etching, and film stripping), an intermediate stage of cell process (including bonding TFT substrate and the CF substrate), and a rear stage of assembling process (including mounting drive ICs and printed circuit board). The front stage of array process generally makes the TFT substrate for controlling the movement of liquid crystal molecules. The intermediate stage of cell process generally introduces the liquid crystal between the TFT substrate and the CF substrate. The rear stage of assembling process generally integrates the drive ICs and the printed circuit board to drive the liquid crystal molecules to rotate for displaying images.

A liquid crystal display panel often needs to coat polyimide (PI) on the TFT substrate and the CF substrate and to apply rubbing or photolithography on the polyimide to form pre-tilt angle to provide liquid crystal molecules with a supporting angle.

Referring to FIG. 1, for the conventional operation of coating polyimide, it generally uses rollers 150 to uniformly distribute a solution of polyimide 170 on a relief printing plate (Asahikasei Photosensitive Resin, APR) 130 and then transfers the polyimide solution 170 from the relief printing plate 130 by means of the rollers 150 to a TFT substrate or a CF substrate 110, while the TFT substrate or the CF substrate 110 is moving in the direction indicated by the arrow so as to complete the coating operation of the polyimide solution 170. However, the known polyimide coating device is relatively complicated and the operation time of coating polyimide is long. Thus, both the coating device and the coating operation are needed to be further improved.

SUMMARY OF THE INVENTION

An object of the present invention is to provide a method for coating polyimide on liquid crystal display panel, which comprises a plurality of nozzles that are tightly arranged together in a row in order to apply the entire row of nozzles to coat polyimide on a glass substrate, whereby the coating device and the coating operation are both simplified, the operation time is shortened, the coating result is enhanced, and the coating cost is reduced.

To achieve the object, the present invention provides a method for coating polyimide on liquid crystal display panel, which comprises the following steps:

Step 1: providing a plurality of nozzles and a glass substrate;

Step 2: tightly and regularly juxtaposing the plurality of nozzles in a row so that the row of nozzles has a length that corresponds to width of the glass substrate;

Step 3: vertically positioning the entire row of the nozzles above the glass substrate so as to correspond to the glass substrate along the width of the glass substrate;

Step 4: simultaneously activating the plurality of nozzles to allow each of the nozzles to simultaneously drip down polyimide solution in an efficient and uniform manner according to predetermined flow rate, while moving the glass substrate so as to have the polyimide solution uniformly applied to the glass substrate form a polyimide film; and Step 5: using a doctor blade to shape the polyimide film that is uniformly coated on the glass substrate so as to provide a regular and flat surface of the polyimide film on the glass substrate.

The plurality of nozzles has an identical structure.

The nozzles are cylindrical nozzles.

The plurality of nozzles has the same flow rate, which is determined according to moving speed of the glass substrate and a desired thickness of the polyimide film to be formed.

The plurality of nozzles is jointly controlled by a single switch so as to simultaneously activate or deactivate the nozzles.

The doctor blade has a length greater than or equal to the width of the glass substrate and the doctor blade is arranged above the moving glass substrate on which the polyimide solution drips.

Thickness of the polyimide film on the glass substrate is controllable by adjusting spacing gab between the doctor blade and the glass substrate.

The doctor blade is a triangular prism shaped doctor blade.

The liquid crystal display panel comprises a TFT substrate, a CF substrate opposite to the TFT substrate, and liquid crystal molecules interposed between the TFT substrate and the CF substrate. The TFT substrate and the CF substrate both comprise a glass substrate. The polyimide solution is coated on the glass substrate.

The present invention also provides a method for coating polyimide on liquid crystal display panel, which comprises the following steps:

Step 1: providing a plurality of nozzles and a glass substrate;

Step 2: tightly and regularly juxtaposing the plurality of nozzles in a row so that the row of nozzles has a length that corresponds to width of the glass substrate;

Step 3: vertically positioning the entire row of the nozzles above the glass substrate so as to correspond to the glass substrate along the width of the glass substrate;

Step 4: simultaneously activating the plurality of nozzles to allow each of the nozzles to simultaneously drip down polyimide solution in an efficient and uniform manner according to predetermined flow rate, while moving the glass substrate so as to have the polyimide solution uniformly applied to the glass substrate form a polyimide film; and Step 5: using a doctor blade to shape the polyimide film that is uniformly coated on the glass substrate so as to provide a regular and flat surface of the polyimide film on the glass substrate; and wherein the plurality of nozzles has an identical structure;

wherein the nozzles are cylindrical nozzles;

wherein the plurality of nozzles has the same flow rate, which is determined according to moving speed of the glass substrate and a desired thickness of the polyimide film to be formed;

wherein the plurality of nozzles is jointly controlled by a single switch so as to simultaneously activate or deactivate the nozzles;

wherein the doctor blade has a length greater than or equal to the width of the glass substrate and the doctor blade is arranged above the moving glass substrate on which the polyimide solution drips;

wherein thickness of the polyimide film on the glass substrate is controllable by adjusting spacing gab between the doctor blade and the glass substrate;

wherein the doctor blade is a triangular prism shaped doctor blade; and wherein the liquid crystal display panel comprises a TFT substrate, a CF substrate opposite to the TFT substrate, and liquid crystal molecules interposed between the TFT substrate and the CF substrate, the TFT substrate and the CF substrate both having a glass substrate, the polyimide solution being coated on the glass substrate.

The beneficial efficacy of the present invention is that the present invention provides a method for coating polyimide on liquid crystal display panel, which comprises a plurality of identical cylindrical nozzles tightly juxtaposed in a row to form a coating device. To perform a coating operation, the nozzles are simultaneously activated and a substrate to be coated is moved to allow polyimide solution to be uniformly and efficiently coated on the glass substrate. This, together with an operation carried out by a doctor blade, makes the surface of polyimide flatter thereby providing excellent result of coating. The method for coating polyimide on liquid crystal display panel of the present invention simplifies coating operation and coating device, shortens operation time, and lowers down coating cost.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, of the present invention will be apparent from the following detailed description of an embodiment of the present invention, with reference to the attached drawings. In the drawings.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
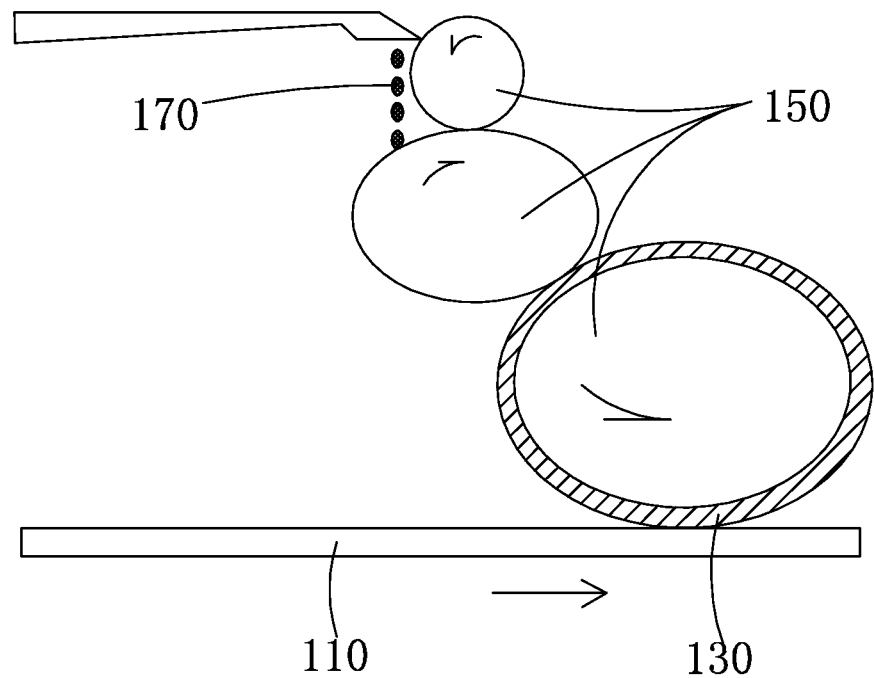
FIG. 1 is a schematic view illustrating a known operation of coating polyimide on a liquid crystal display panel.
Figure 2:
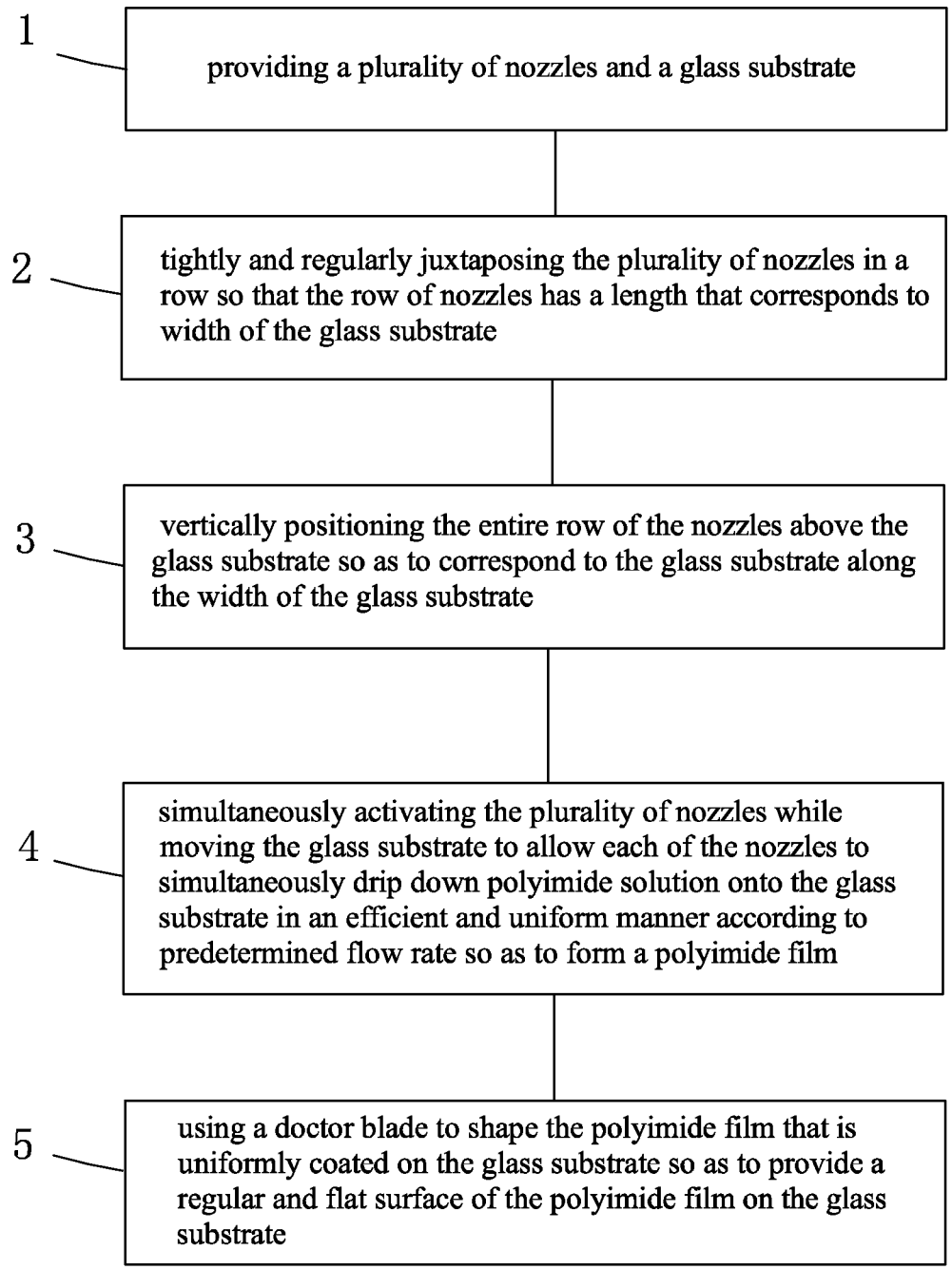
FIG. 2 is a flow chart illustrating a method for coating polyimide on liquid crystal display panel according to the present invention.
Figure 3:
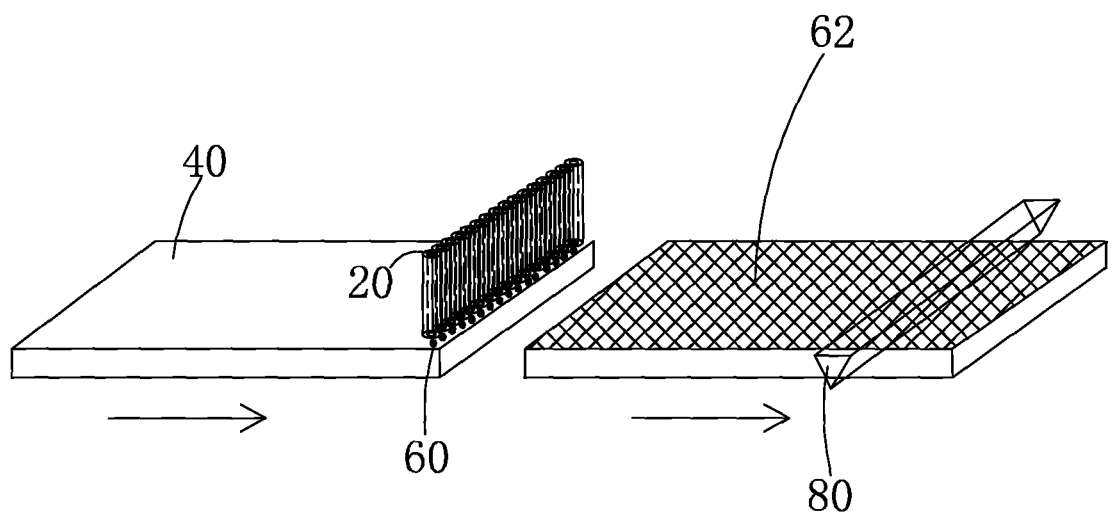
FIG. 3 is a schematic view illustrating an operation of coating polyimide on a liquid crystal display panel according to the present invention.

Referring to FIGS. 2 and 3, the present invention provides a method for coating polyimide on liquid crystal display panel, wherein the liquid crystal display panel comprises a thin-film transistor (TFT) substrate, a color filter (CF) substrate opposite to the TFT substrate, and liquid crystal molecules interposed between the TFT substrate and the CF substrate. Both the TFT substrate and the CF substrate comprise a glass substrate and polyimide is coated on the glass substrate. The coating method comprises the following steps:

Step 1: providing a plurality of nozzles 20 and a glass substrate 40.

The plurality of nozzles 20 has an identical structure and in the instant embodiment, the nozzles 20 are cylindrical nozzles. The glass substrate 40 is arranged to be movable and preferably, the glass substrate 40 is positioned on a conveyor belt (not shown).

Step 2: tightly and regularly juxtaposing the plurality of nozzles 20 in a row so that the row of nozzles 20 has a length that corresponds to width of the glass substrate 40.

The length of the row of nozzles 20 is set to correspond to the width of the glass substrate 40 in order to ensure that polyimide solution 60 may completely drip down to the glass substrate 40 without causing incomplete coating or a waste caused by dripping outside the glass substrate 40.

Step 3: vertically positioning the entire row of the nozzles 20 above the glass substrate 40 so as to correspond to the glass substrate 40 along the width of the glass substrate 40.

The entire row of nozzles 20 has outer edges that are set in alignment with outer edges of the glass substrate 40 to avoid incomplete coating or a waste caused by dripping outside the glass substrate 40.

Step 4: simultaneously activating the plurality of nozzles 20 while moving the glass substrate 40 to allow each of the nozzles 20 to simultaneously drip down the polyimide solution 60 onto the glass substrate 40 in an efficient and uniform manner according to predetermined flow rate so as to form a polyimide film 62. The glass substrate 40 moves in the direction indicated by arrow.

Each of the nozzles 20 has identical flow rate and the flow rate is determined according to the moving speed of the glass substrate 40 and the desired thickness of the polyimide film 62 so coated. The plurality of nozzles 20 is jointly controlled by a single switch (not shown) so as to simultaneously activate or deactivate the nozzles 20 to ensure uniformity of the coating of the polyimide solution 60 and thus ensure quality of the liquid crystal display panel.

Step 5: using a doctor blade 80 to shape the polyimide film that is uniformly coated on the glass substrate 40 so as to provide a regular and flat surface of the polyimide film 62 on the glass substrate 40.

The doctor blade 80 is arranged above the moving glass substrate 40 on which the polyimide solution 60 drips. The doctor blade 80 has a length greater than or equal to the width of the glass substrate 40. Preferably, the length of the doctor blade 80 is slightly greater than the width of the glass substrate 40 to ensure uniformity and flatness of the surface of the polyimide film 62.

It is noted that through adjusting the spacing gap between the doctor blade 80 and the glass substrate 40, the thickness of the polyimide film 62 formed on the glass substrate 40 can be properly controlled.

The doctor blade 80 can be a triangular prism shaped doctor blade.

In summary, the present invention provides a method for coating polyimide on liquid crystal display panel, which simplifies the coating operation and coating device, shortens the operation time, and lowers down coating cost by tightly juxtaposing a plurality of identical cylindrical nozzles in a row to form a coating device. To perform a coating operation, the nozzles are simultaneously activated and a substrate to be coated is moved to allow polyimide solution to be uniformly and efficiently coated on the glass substrate. This, together with an operation carried out by a doctor blade, makes the surface of polyimide flatter thereby providing excellent result of coating.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A method for coating polyimide on a liquid crystal display panel, comprising the following steps:
   (1) providing a plurality of cylindrical nozzles and a glass substrate;
   (2) arranging the plurality of cylindrical nozzles closely side by side in a row so that the row of nozzles has a length that corresponds to a width of the glass substrate;
   (3) vertically positioning the entire row of the nozzles above the glass substrate so as to correspond to the glass substrate along the width of the glass substrate;
   (4) simultaneously activating the plurality of nozzles to allow each of the nozzles to simultaneously drip down polyimide solution according to a predetermined flow rate, while moving the glass substrate so as to have the polyimide solution uniformly applied to the glass substrate to form a polyimide film; and
   (5) using a doctor blade to shape the polyimide film that is uniformly coated on the glass substrate so as to provide a substantially flat surface of the polyimide film on the glass substrate.

2. The method as claimed in claim 1, wherein the plurality of nozzles has an identical structure.

3. The method as claimed in claim 1, wherein the plurality of nozzles has the same flow rate, which is determined according to a moving speed of the glass substrate and a desired thickness of the polyimide film to be formed.

4. The method as claimed in claim 1, wherein the plurality of nozzles is jointly controlled by a single switch so as to simultaneously activate or deactivate the nozzles.

5. The method as claimed in claim 1, wherein the doctor blade has a length greater than or equal to the width of the glass substrate and the doctor blade is arranged above the moving glass substrate on which the polyimide solution drips.

6. The method as claimed in claim 5, wherein a thickness of the polyimide film on the glass substrate is controllable by adjusting a spacing gap between the doctor blade and the glass substrate.

7. The method as claimed in claim 5, wherein the doctor blade is a triangular prism shaped doctor blade.

8. The method as claimed in claim 1, wherein the liquid crystal display panel comprises a thin-film transistor (TFT) substrate, a color filter (CF) substrate opposite to the TFT substrate, and liquid crystal molecules interposed between the TFT substrate and the CF substrate, the TFT substrate and the CF substrate both comprising a glass substrate, the polyimide solution being coated on the glass substrate of one of the TFT substrate and the CF substrate.

9. A method for coating polyimide on a liquid crystal display panel, comprising the following steps:
   (1) providing a plurality of cylindrical nozzles and a glass substrate;
   (2) arranging the plurality of cylindrical nozzles closely side by side in a row so that the row of nozzles has a length that corresponds to a width of the glass substrate;
   (3) vertically positioning the entire row of the nozzles above the glass substrate so as to correspond to the glass substrate along the width of the glass substrate;
   (4) simultaneously activating the plurality of nozzles to allow each of the nozzles to simultaneously drip down polyimide solution according to a predetermined flow rate, while moving the glass substrate so as to have the polyimide solution uniformly applied to the glass substrate to form a polyimide film; and
   (5) using a doctor blade to shape the polyimide film that is uniformly coated on the glass substrate so as to provide a substantially flat surface of the polyimide film on the glass substrate; and
   wherein the plurality of nozzles has an identical structure;
   wherein the plurality of nozzles has the same flow rate, which is determined according to a moving speed of the glass substrate and a desired thickness of the polyimide film to be formed;
   wherein the plurality of nozzles is jointly controlled by a single switch so as to simultaneously activate or deactivate the nozzles;
   wherein the doctor blade has a length greater than or equal to the width of the glass substrate and the doctor blade is arranged above the moving glass substrate on which the polyimide solution drips;
   wherein a thickness of the polyimide film on the glass substrate is controllable by adjusting a spacing gap between the doctor blade and the glass substrate;
   wherein the doctor blade is a triangular prism shaped doctor blade; and
   wherein the liquid crystal display panel comprises a thin-film transistor (TFT) substrate, a color filter (CF) substrate opposite to the TFT substrate, and liquid crystal molecules interposed between the TFT substrate and the CF substrate, the TFT substrate and the CF substrate both comprising a glass substrate, the polyimide solution being coated on the glass substrate of one of the TFT substrate and the CF substrate.

* * * * *